US008658266B2

(12) United States Patent
Lee

(10) Patent No.: US 8,658,266 B2
(45) Date of Patent: *Feb. 25, 2014

(54) READHERABLE, REPOSITIONABLE AND REUSABLE ADHESIVE FABRIC PAPER FOR PRINTING AND MANUFACTURING METHOD OF THE SAME

(76) Inventor: Sang Young Lee, Daegu (KR)

( * ) Notice: Subject to any disclaimer, the term of this patent is extended or adjusted under 35 U.S.C. 154(b) by 53 days.

This patent is subject to a terminal disclaimer.

(21) Appl. No.: 13/351,123

(22) Filed: Jan. 16, 2012

(65) Prior Publication Data

US 2012/0135654 A1 May 31, 2012

Related U.S. Application Data

(62) Division of application No. 12/500,466, filed on Jul. 9, 2009, now Pat. No. 8,123,893.

(51) Int. Cl.
*B32B 9/00* (2006.01)
*B32B 7/12* (2006.01)

(52) U.S. Cl.
USPC .............. 428/40.1; 428/343; 428/354

(58) Field of Classification Search
USPC ........................ 428/40.1, 343, 354
See application file for complete search history.

(56) References Cited

U.S. PATENT DOCUMENTS

| 8,123,893 | B2 * | 2/2012 | Lee ............................... 156/278 |
| 2002/0022420 | A1 | 2/2002 | Veiga et al. |
| 2010/0120310 | A1 | 5/2010 | Lanitz |

* cited by examiner

*Primary Examiner* — Victor Chang
(74) *Attorney, Agent, or Firm* — IPLA P.A.; James E. Bame

(57) ABSTRACT

An adhesive fabric paper for printing is used to color printers for personal computers, printing machines for indoor and outdoor advertising, wide format printers, plotters to print colored images. The manufacturing method includes: heating and cooling a woven fabric; preparing a first "S" coating liquid, a second "S" coating liquid and an "R" coating liquid as coating liquids to be coated on the front face of the fabric and maturing them for three days; coating twice the rear face of the fabric; coating once the rear face of the fabric; carrying out first and second "S" coating works on the front face of the fabric with the first "S" coating liquid and the second "S" coating liquid; coating twice the front face of the fabric with the "R" coating liquid; and laminating a backer coated with an adhesive to the fabric.

5 Claims, 3 Drawing Sheets

READHERABLE, REPOSITIONABLE AND REUSABLE ADHESIVE FABRIC PAPER FOR PRINTING AND MANUFACTURING METHOD OF THE SAME

CROSS REFERENCES

This application is a divisional of application Ser. No. 12/500,466 which is now pending.

BACKGROUND OF THE INVENTION

1. Field of the Invention

The present invention relates to a readherable, repositionable and reusable adhesive fabric paper that is used to color printers for personal computers, printing machines for indoor and outdoor advertising, wide format printers, plotters, and so on to print colored images.

2. Background Art

More particularly, the present invention is characterized in that the adhesive fabric paper allows any printer to easily print, can be freely readhered onto many places several times, does not leave an adhered mark when it is come off, and does not damage a place where this product will be adhered (for instance, on a painted wall, on wallpaper, or on an existing advertising medium previously attached to any one place).

Furthermore, the present invention is characterized in that the adhesive fabric paper is soft and reusable several times, allows a higher resolution image and a superior image quality, and prevents decoloration of printed images. Moreover, the adhesive fabric paper according to the present invention has an effect for shading the sun by adding a gray coating on the rear face of the fabric through a special technique to thereby allow an easy window decoration in the summer season, and can protect a human body since the fabric and an adhesive layer of this product can serve to fix broken window pieces to a certain extent when a window is broken.

Additionally, the adhesive fabric paper according to the present invention is a superior product in various aspects including a cutting work.

In general, paper and vinyl are mainly used for printing. However, recently, with a development of various advertising techniques, printing methods to print on fibrous materials is increasing.

As a representative example, there are banners that are recently used to output images through a wide format printer or a plotter.

However, such fabrics for printing have several problems in that the degrees of clarity and detail are low due to a low printing quality, in that it is decolorated rapidly after the printing, in that it requires thermal cutting that is expensive and takes much time since yarns of a cut portion are unloosed when the fabric is cut as much as a necessary size, and in that it is inconvenient to adhere and remove an advertising thing.

SUMMARY OF THE INVENTION

Accordingly, the present invention has been made to solve the above-mentioned problems occurring in the prior arts, and it is an object of the present invention to provide a readherable, repositionable and reusable adhesive fabric paper, which is fit to a new advertising period, can reduce a customer's burden on costs a bit, allows the customer to easily and directly carry out printing, allows a higher resolution image and a superior image quality, and prevents decoloration of printed images.

Furthermore, it is another object of the present invention to provide a readherable, repositionable and reusable adhesive fabric paper, which has an effect for shading the sun to thereby allow an easy window decoration in the summer season, can protect a human body when a window is broken, and is easy to cut.

To accomplish the above object, according to the present invention, there is provided a method for manufacturing a readherable, repositionable and reusable adhesive fabric paper for printing images, comprising the processes of: heating and cooling rapidly a woven fabric so that its width is shrunk by 10% to 15%; preparing a first "S" coating liquid containing ethylene vinyl acetate copolymer of 40~50% by weight, a second "S" coating liquid containing polyurethane resin of 25% by weight, and an "R" coating liquid containing low molecular alcohol of 60~75% by weight and silicon dioxide (silica) of 8~12% by weight as coating liquids to be coated on the front face of the fabric, and maturing them for three days; coating twice the rear face of the fabric with a mixture in which polyurethane resin and a white pigment are mixed together, and coating once the rear face of the fabric with a mixture in which polyurethane resin and a gray pigment are mixed together; coating the front face of the fabric using the prepared "S" coating liquids and the "R" coating liquid, wherein a first coating is carried out using the first "S" coating liquid, a second "S" coating is carried out using the second "S" coating liquid, and the "R" coating liquid is coated on the front face of the fabric twice; and laminating a backer coated with an adhesive to the coated fabric.

The adhesive fabric paper according to the present invention allows any printer to easily print, can be freely readhered onto many places several times, does not leave an adhered mark when it is come off, and does not damage a place where this product will be adhered (for instance, on a painted wall, on wallpaper, or on an existing advertising medium previously attached to any one place).

Furthermore, the adhesive fabric paper according to the present invention is soft and reusable several times, allows a higher resolution image and a superior image quality, and prevents decoloration of printed images. Moreover, the adhesive fabric paper according to the present invention has an effect for shading the sun by adding a gray coating on the back of the fabric through a special technique to thereby allow an easy window decoration in the summer season, and can protect a human body since the fabric and an adhesive layer of this product can serve to fix broken window pieces to a certain extent when a window is broken.

Additionally, the adhesive fabric paper according to the present invention is a superior product in various aspects including a cutting work.

Accordingly, the adhesive fabric paper for printing according to the present invention is a convenient product, which is freely readherable to various places for indoor and outdoor advertisings, such as commercial advertising, domestic printing paper, wallpaper decoration, advertising of various kinds using vehicles, picketing, postcards, bromides, and so on.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
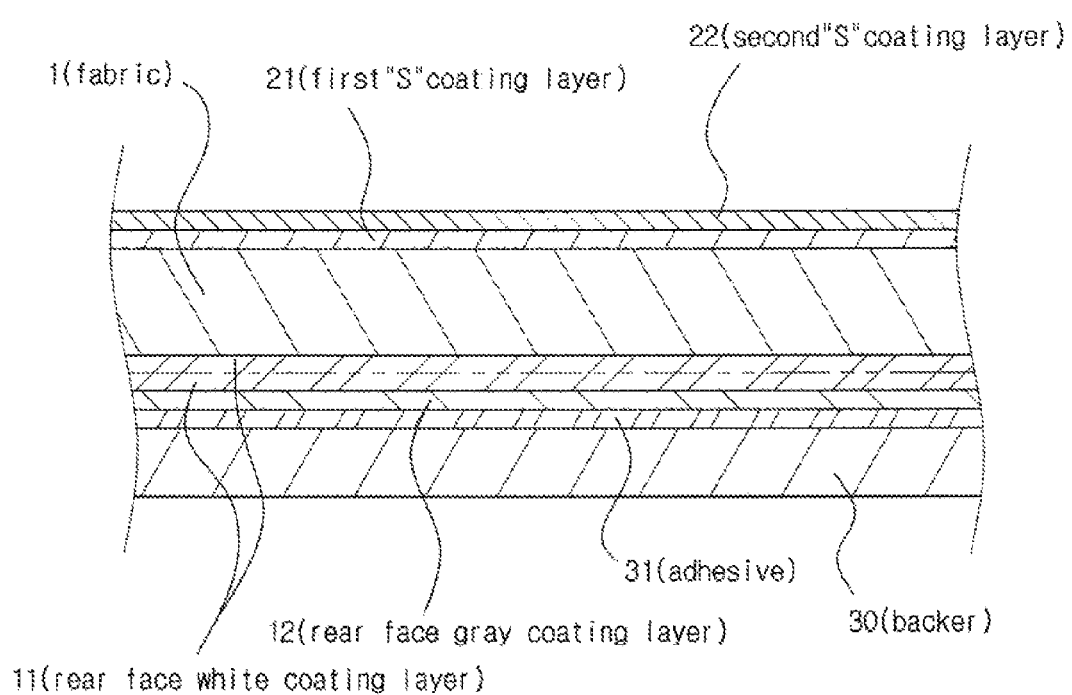
FIG. 1 is an enlarged sectional view of an adhesive fabric paper according to the present invention.
Figure 2:
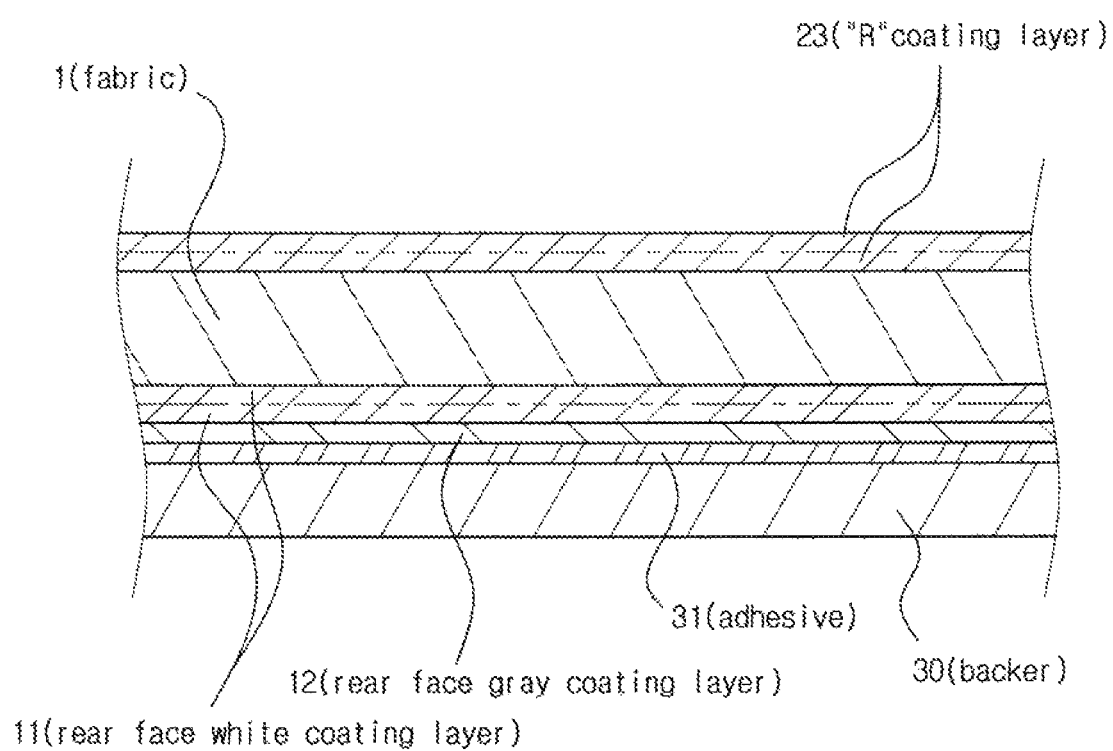
FIG. 2 is another enlarged sectional view of the adhesive fabric paper according to the present invention.
Figure 3:
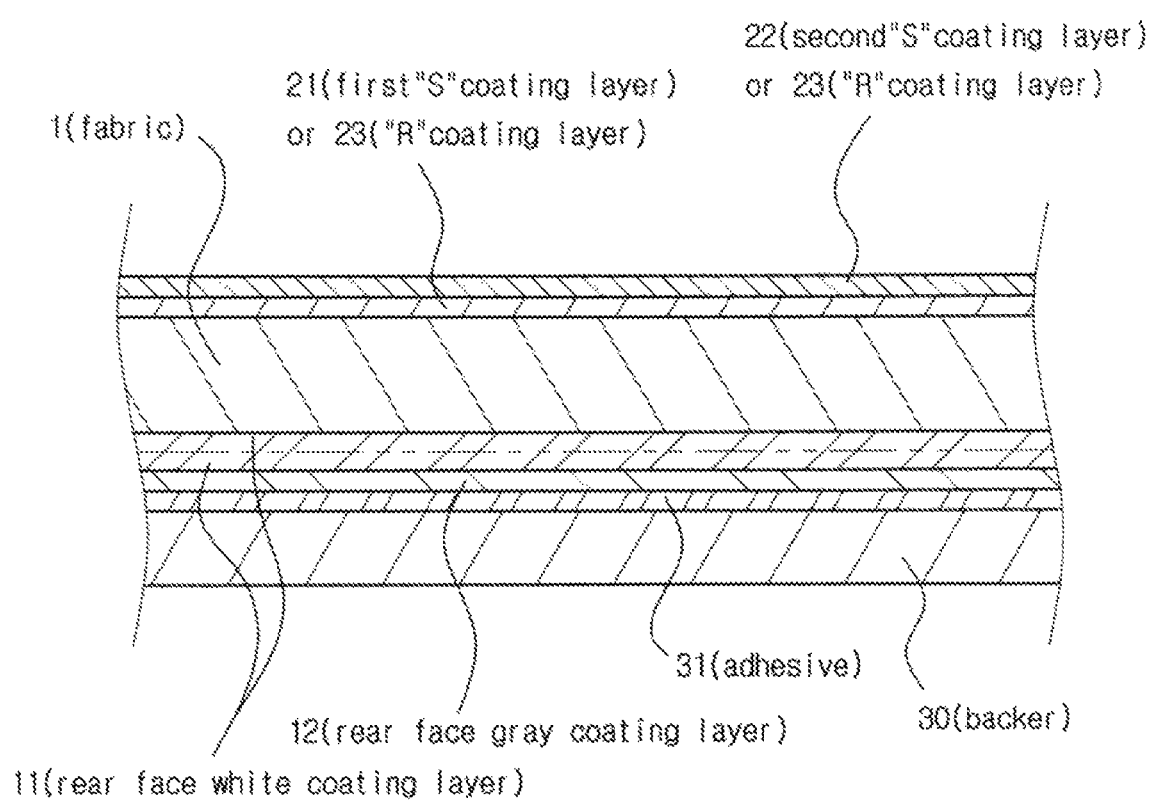
FIG. 3 is another enlarged sectional view of the adhesive fabric paper according to the present invention.

Reference will be now made in detail to the preferred embodiment of the present invention with reference to the attached drawings.

It is the best to use polyester DTYs (Draw Textured Yarns) for a fabric.

The reason is that the polyester DTYs can absorb a coating liquid deepest of fabrics all when the coating liquid for receiving ink sufficiently is coated on the fabric during a manufacturing process of an adhesive fabric paper according to the present invention, and make the coating liquid exist between pieces of yarns to thereby prevent the coating liquid from being separated from the fabric supremely after coating.

Moreover, the polyester DTYs can allow a print ink to be evenly and deeply distributed on the coating liquid sufficiently absorbed into the fabric and existing between the pieces of yarn to thereby provide excellent image resolution and vividness.

The polyester DTYs are woven with the warp of 75 denier per 36 filaments and the weft of 150 denier per 48 filaments wherein the warp density is about 8,800 yarns and the weft density is 72 T per inch.

Furthermore, the polyester DTYs may be woven with the warp of 75 denier per 72 filaments and the weft of 75 denier per 72 filaments.

Next, the fabric is heated and cooled rapidly so that its width is reduced by 10% to 15%. There are various heating methods, but in this invention, a JIG type machine is used, and in this instance, the fabric is treated for 7 to 8 hours while keeping temperature of 180° C. when the width of the fabric is 74 inches.

After the above process, the fabric is cooled rapidly to thereby be shrunk. The rapidly cooling process is carried out twice in such a way that the fabric is shrunk sufficiently till it becomes a 74-inch fabric with a width ranging 64 inches to 65 inches.

Then, the fabric density gets higher so that yarns close together and get dense, and hence, it can be prevented that the coating liquid is permeated to the rear face of a coated face during a rear face coating process, which will be carried out later.

It also can prevent the curling of the fabric and the tunneling between the fabric and the backer caused by a shrinkage of the fabric on the backer after this surface-coated product is completely laminated to the backer.

Since fabrics are different in quantity to absorb moisture, they cause the curling and tunneling when they come in contact with paper. Accordingly, when the fabric is matured several times during a sufficient period of time to thereby prevent the shrinkage of the product after the lamination of the product.

To make coating liquid, in this invention, coating liquids of two types are used: one being an "S" coating liquid for solvent-based ink; and the other being an "R" coating liquid for dyes-based ink, pigment-based ink and UV ink.

Prepare the coating liquids before three days from the use. The reason is to mature them for about three days and to make time that different ingredients of the coating liquids react with each other sufficiently.

After that, put a central rotating shaft into a container having the coating liquid therein and sufficiently mix the coating liquid at high speed for about 30 minutes before the use to thereby make viscosity of the coating liquid sufficiently thin and keep its white color evenly.

Particularly, the "S" coating liquid is divided into a first coating liquid and a second coating liquid, which are different coating liquids. Furthermore, the "R" coating liquid is coated twice.

Basic ingredients of the "S" coating liquid are as follows.

<First Coating Liquid>

| Chemical characterization | CAS NO | WT % |
|---|---|---|
| Ethylene vinyl acetate copolymer | 24937-78-8 | 40~50 |
| additive | — | 5~10 |
| water | 7732-18-5 | 40~60 |

<Second Coating Liquid>

| Chemical characterization | CAS NO | WT % |
|---|---|---|
| Polyurethane Resin | 51-79-6 | app. 25 |
| additive | — | app. 10 |
| Methyl alcohol | 67-56-1 | app. 60 |

Basic ingredients of the "R" coating liquid are as follows.

| Chemical characterization | CAS NO | WT % |
|---|---|---|
| Low molecular alcohol | 67-56-1 | 60~75 |
| Silicon dioxide(silica) | 112945-52-5 | 8~12 |
| Additive | mixture | 9~12 |
| Polyacrylate copolymer | — | 10~15 |

To make a treatment of rear face of the fabric, first, mix polyurethane resin and a white pigment together and carry out a white coating (hereinafter, called rear face white coating) to the rear face of the fabric. Next, mix polyurethane resin and a gray pigment together and carry out a gray coating (hereinafter, called rear face gray coating).

The rear face white coating and the rear face gray coating are used as methods for waterproof of umbrellas or parasols for shading the sun because they have strong water resistance. In the present invention, they are used to make an adhesive be coated well and prevent penetration of the adhesive into the fabric in the following process.

If the adhesive penetrates through the fabric, it will be caused that decoloration of an image printed on the front face will be hastened. Moreover, the rear face white coating and the rear face gray coating serve to prevent loosening of yarns when the adhesive fabric paper is cut in a predetermined size and when it is cut in a roll type since they serve to fix yarns.

As described above, the present invention can reduce expenses since it can be cut by a cutting blade, which is inexpensive and fast without needing the expensive heat cutting, which takes much time, due to the rear face white coating and the rear face gray coating serving to prevent loosening of yarns. Additionally, this process is carried out to prevent transmission of light into the fabric and shade the sun.

Especially, this process is also carried out to prevent that the existing background color or pictures or characters of the previously adhered advertisement are shown through on the surface of the present invention when the adhesive fabric paper of the present invention is adhered on a certain place.

In addition, this process is carried out not in such a way as to just form a thin white coating layer and a thin gray coating layer but in such a way as to treat the rear face white coating and the rear face gray coating after respectively mixing the white pigment and the gray pigment with polyurethane resin, and hence, it may give the same effect as that the fabric gets dyed white and gray. Accordingly, since this process increases the effect of the white coating of the front face ("S" coating and "R" coating) and doubles the effect of the gray coating of the rear face, the fabric and the adhesive are cleanly removed together without leaving any gray spot on a wall or a surface when the adhesive fabric paper of the present invention is adhered on and removed from the wall or the surface.

In other words, the present invention can be adhered on the existing and previously adhered advertising thing without any problem in various aspects. Especially, after the above process, carry out the "S" coating or the "R" coating on the opposite face of the face where this process is carried out.

Then, the color of the rear face gray coating does not give any influence and change on the "S"-coated or "R"-coated white face, the "S"-coated or "R"-coated white face can keep its white color more clearly by the rear face white coating, and the characteristic of the rear face gray coating for shading the sun can be kept as it is.

The existing vinyl products require many expenses since they must be used after the previously adhered advertising things and adhered remnants are all removed. Actually, the vinyl products have a problem in that it is inconvenient and complex to adhere it and carry out other works because they leave thin vinyl layers on a wall or an advertising pole when they are removed.

Accordingly, in the present invention, the fabric is laminated with a backer through a removable adhesive, which will be processed in the next process, so that the present invention can be easily removed without any damage to the existing wallpaper or a painted place and without leaving adhered remnants, and is readherable and reusable several times.

This process includes the following steps.

<Rear Face White Coating>

Mix polyurethane resin and the white pigment together in the ratio of 6:4 (For instance, polyurethane resin of 30 g+white pigment of 20 g). The mixture of 50 g is used per 1 yard with the width of 65 inches.

An interval of a coating knife from the surface of the fabric during coating is 0.8 mm during the first cutting and 1 mm during the second cutting, and the room temperature of a drying room for drying the coating liquid is kept in a range of 150° C. to 170° C.

Here, it is important to carry out the coating again through the same process. The reason is that to coat thin twice gives clearer white color than to coat thick once and that the rear face gray coating, which will be carried out next, can minimize transparentness without any influence on the "S"-coated or "R"-coated white surface.

As described above, this step can fix the yarns in such a way that the yarns are not loosed as firm as possible and prevent penetration of the adhesive into the surface since films are formed doubly.

<Rear Face Gray Coating>

Mix polyurethane resin and the gray pigment together in the ratio of 6:4 (For instance, polyurethane resin of 30 g+white pigment of 20 g). The mixture of 50 g is used per 1 yard with the width of 65 inches.

An interval of a coating knife from the surface of the fabric during coating is 0.5 mm during the first cutting and 0.8 mm during the second cutting, and the room temperature of the drying room for drying the coating liquid is kept in a range of 150° C. to 170° C.

This step is carried out once. Differently from the rear face white coating, since the gray pigment used in the rear face gray coating has a high saturation, it can show a satisfied effect through just one coating.

In the process of a surface coating of the fabric, as described above, the "S" coating liquid or the "R" coating liquid, which are different sorts, are used. The "S" coating or the "R" coating are carried out on the opposite face of the face to which the rear face white coating and the rear face gray coating are applied.

In other words, after the white coating and the gray coating are applied to the rear face, the "S" coating or the "R" coating are applied to the opposite face of the rear face (namely, the front face). Accordingly, this process can be carried out easily because the rear face coating liquids are not stained on the surface of the fabric to which the "S" coating or the "R" coating will be applied. Such an effect may be obtained also through the heating process of the fabric, which is described above.

After the first coating, dry and cool the fabric. After that, carry out the second coating, and then dry the fabric.

Particularly, compared with a method that coating ingredients are all mixed together and coating is carried out once, this method to coat and dry twice can make the coating liquid penetrate into the fabric evenly and separate the coating layers from each other, so that the first coating serves as a underpainting and as a medium to fix the fabric in such a way that the second coating liquid does not easily separate from the fabric. Furthermore, the method can prevent an easy decoloration of the surface coating of the fabric even though water permeated.

The second coating serves to absorb ink evenly and to express colors vividly.

Especially, because the second coating is carried out in a cooled condition after the first coating and drying, it can prevent that the coating liquid is coated on the fabric in a lump since the coating liquid is hardened during the second coating directly before it is distributed on the fabric evenly due to heat permeated into the fabric during the first coating. Also, it can minimize formation of coating lines on the surface of the fabric during the coating. In comparison with the method that coating ingredients are all mixed together and coating is carried out once, this method to coat and dry twice can prevent transmission of light by keeping the respective separate coating layers and maximize the effects of the respective coating liquids.

Furthermore, through this method, the second coating liquid can be firmly fixed on the first coating liquid.

Next, how to carry out the "S" coating or the "R" coating will be described.

<First "S" Coating>

The coating liquid of 62 g to 69 g is used per 1 yard with the width of 65 inches, and an interval of a coating knife from the surface of the fabric during coating is 1.5 mm. The room temperature of the drying room for drying the coating liquid is kept in a range of 170° C. to 190° C.

The surface tension of the fabric is kept in a relatively loose condition as much as the knife interval of 1.5 mm so that the coating liquid can be coated satisfactorily. If the surface tension is too strong, the coating liquid is coated too thin and the fabric may be shrunk again after the completion of the product, and hence, the surface tension is to prevent tunneling between the fabric and the backer after the fabric and the backer are laminated together.

<Second "S" Coating>

The coating liquid of 34 g to 41 g is used per 1 yard with the width of 65 inches, and an interval of a coating knife from the surface of the fabric during coating is 2 mm. The room temperature of the drying room for drying the coating liquid is kept in a range of 170° C. to 190° C. The surface tension of the fabric is kept in a relatively loose condition as much as the knife interval of 2 mm so that the coating liquid can be coated satisfactorily. The reason is the same as the description of the first "S" coating.

<First "R" Coating>

The coating liquid of 62 g to 69 g is used per 1 yard with the width of 65 inches, and an interval of a coating knife from the surface of the fabric during coating is 1.5 mm. The room temperature of the drying room for drying the coating liquid is kept in a range of 165° C. to 180° C. The surface tension of the fabric is kept in a relatively loose condition as much as the knife interval of 1.5 mm so that the coating liquid can be coated satisfactorily.

<Second "R" Coating>

The coating liquid of 62 g to 69 g is used per 1 yard with the width of 65 inches, and an interval of a coating knife from the surface of the fabric during coating is 2 mm. The room temperature of the drying room for drying the coating liquid is kept in a range of 165° C. to 180° C. The surface tension of the fabric is kept in a relatively loose condition as much as the knife interval of 2 mm so that the coating liquid can be coated satisfactorily.

After the above process, mature the coating fabric in a natural condition for three or four days.

It is to prevent the curling of the fabric and the tunneling between the fabric and the backer again due to shrinkage of the fabric on the backer after the fabric and the backer are laminated together.

Since fabrics are different in quantity to absorb moisture, there occur the curling and tunneling when they come in contact with paper. Accordingly, when the fabric is matured in a natural condition during a sufficient period of time to thereby prevent the shrinkage of the product after the lamination of the product.

For lamination of fabric and backer and other processes, lamination is carried out by a comma coater.

As the backer, a white vellum sheet having a thickness of about 100 g, which is the most suitable for the environments required by the fabric used in this process and is similar to the surface fabric in speed to absorb and release moisture. Additionally, as time goes by, the fabric and the backer are all shrunk little by little, and hence, the white vellum sheet having the thickness of about 100 g is selected in order to keep a similar shrinking radial width.

As another method, as the backer, PET paper may be used, but it is preferable that the white vellum sheet having a thickness of about 100 g if possible. The backer of the vellum sheet is not even and flat in the surface, but it is advantageous in that the backer is easily separated from the surface fabric since the uneven surface gives air-permeability when the surface fabric is removed from the backer for use in a state where the uneven surface comes in close contact with the adhesive portion and the surface fabric.

The surface of the PET paper is more smooth and flat than the white vellum sheet of 100 g and even in the surface. However, since the PET paper is considerably low in air-permeability, it is difficult to easily separate it from the backer when the surface fabric is removed from the backer for use in a state where the PET paper comes in close contact with the adhesive portion and the surface fabric.

Basic ingredients of the removable adhesive are as follows.

| INGREDIENTS | CAS NO | Weight (%) |
|---|---|---|
| Acrylic Polymer | — | 31-35 |
| Ethyl acetate | 147-78-6 | 35-45 |
| Toluene | 108-88-3 | 10-20 |

Add a hardener of 2 g to compound solvent of 100 g to make total 102 g. This rate is the ideal rate to keep a strong adhesive force and to make the backer be easily removed.

Mix the compound solvent and the hardener for 30 minutes and coat the adhesive on the backer evenly. In this instance, the most preferred thickness of the adhesive for the surface fabric of the present invention is 1.8 micron to 2.0 micron.

After the lamination, since the polyester DTY absorbs the adhesive to a certain extent, if the thick coating is applied to the backer, the adhesive is evaporated and dried to a predetermined degree through a thermal drier, and then, the adhesive of the most suitable amount remains.

After the backer coated with the adhesive passes the drying room, the backer and the surface fabric are pressed together by a roller to thereby form a laminated sheet. In this instance, it is the most important to perform the laminating work in a state where the backer coated with the adhesive come in contact with the opposite face of the surface-coated face of the fabric, namely, the face to which the rear face gray coating was applied.

The reason is that the removable adhesive must be coated on the rear face of the surface-coated fabric, namely, the face to which the rear face gray coating was applied.

After the laminating work is completed, mature the product at the room temperature of about 50° C. for one day and carry out various cuttings (roll cutting, and re-cutting). Also, in this instance, roll the product in the opposite direction of a direction that the product is rolled previously, and then, start cutting after three or four hours. The reason is to keep smoothness of the finished product by re-rolling the fabric and the backer, which are rolled in one direction, in the opposite direction.

In brief, the adhesive fabric paper according to the present invention is made through the following steps.

Heat and cool rapidly the fabric woven with polyester DTYs, so that its width is reduced by 10% to 15%.

After that, coat the rear face of the fabric 1 with the coating liquid, which is made by mixing polyurethane resin and the white pigment in the ratio of 6:4, twice to thereby form a rear face white coating layer 11.

Coat the rear face of the fabric 1 with the coating liquid, which is made by mixing polyurethane resin and the gray pigment in the ratio of 6:4, once to thereby form a rear face gray coating layer 12.

Coat the fabric with the first "S" coating liquid containing ethylene vinyl acetate copolymer of 40~50% by weight to thereby form a first "S" coating layer 21.

Next, coat the fabric with the second "S" coating liquid containing polyurethane resin of 25% by weight to thereby form a second "S" coating layer 22.

Furthermore, coat the fabric with the "R" coating liquid containing low molecular alcohol of 60~75% by weight and silicon dioxide (silica) of 8~12% by weight twice to thereby form an "R" coating layer 23. After that, the backer 30 coated with the adhesive 31 is laminated on the rear face of the fabric.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A readherable, repositionable and reusable adhesive fabric paper for printing images comprising:
   a fabric (1) woven with polyester DTYs (Draw Textured Yarns), the fabric (1) being heated and cooled rapidly in such a way that its width is shrunk by 10% to 15%;
   a first "S" coating layer (21), in which ethylene vinyl acetate copolymer is the main ingredient, being coated on the front face of the fabric; and
   a second "S" coating layer (22), in which poly urethane resin is the main ingredient, being coated on the front face as a second "S" coating liquid; or
   an "R" coating layer (23) twice coated with an "R" coating liquid, in which low molecular alcohol is the main ingredient, in lieu of the first "S" coating layer (21) and the second "S" coating layer (22).

2. The readherable, repositionable and reusable adhesive fabric paper according to claim 1, wherein in the case that the front face of the fabric includes the first "S" coating layer and the second "S" coating layer, the first "S" coating contains ethylene vinyl acetate copolymer of 40~50% of the first "S" coating by weight, and the second "S" coating contains polyurethane resin of 25% of the second "S" coating by weight.

3. The readherable, repositionable and reusable adhesive fabric paper according to claim 1, wherein the rear face of the fabric (1) includes:
   a rear face white coating layer (11) formed in such a way that a coating, which is made by mixing polyurethane resin and a white pigment in the ratio of 6:4, is twice coated on the rear face of the fabric (1); and
   a rear face gray coating layer (12) formed in such a way that a coating, which is made by mixing polyurethane resin and a gray pigment in the ratio of 6:4, is once coated on the rear face of the fabric (1).

4. The readherable, repositionable and reusable adhesive fabric paper according to claim 1, further comprising:
   a backer (30) that is coated with an adhesive (31) on the rear face thereof, the backer (30) being laminated to the coated fabric.

5. The readherable, repositionable and reusable adhesive fabric paper according to claim 3, further comprising:
   a backer (30) that is coated with an adhesive (31) on the rear face thereof, the backer (30) being laminated to the coated fabric.

* * * * *